(12) United States Patent
Raskin et al.

(10) Patent No.: US 9,799,082 B1
(45) Date of Patent: Oct. 24, 2017

(54) SYSTEM AND METHOD FOR CONVERSATION DISCOVERY

(71) Applicant: Post Social, Inc., Oakland, CA (US)

(72) Inventors: Aza Raskin, Oakland, CA (US); Adam Rothman, Oakland, CA (US); Juan-Carlos Foust, Oakland, CA (US); Ruud de Rooij, Oakland, CA (US); Mike Kurlowsk, Oakland, CA (US)

(73) Assignee: Post Social, Inc., Oakland, CA (US)

( * ) Notice: Subject to any disclaimer, the term of this patent is extended or adjusted under 35 U.S.C. 154(b) by 0 days.

(21) Appl. No.: 15/497,016

(22) Filed: Apr. 25, 2017

Related U.S. Application Data

(60) Provisional application No. 62/237,241, filed on Apr. 25, 2016, provisional application No. 62/434,846, filed on Dec. 15, 2016.

(51) Int. Cl.
| | |
|---|---|
| *G06F 15/16* | (2006.01) |
| *G06Q 50/00* | (2012.01) |
| *G06F 17/30* | (2006.01) |
| *H04L 29/08* | (2006.01) |
| *H04L 29/06* | (2006.01) |
| *H04L 12/58* | (2006.01) |

(52) U.S. Cl.
CPC ....... *G06Q 50/01* (2013.01); *G06F 17/30648* (2013.01); *G06F 17/30867* (2013.01); *H04L 65/60* (2013.01); *H04L 67/1002* (2013.01); *H04L 51/16* (2013.01); *H04L 51/32* (2013.01)

(58) Field of Classification Search
CPC ......... G06F 17/30345; G06F 17/30029; G06F 17/30489; H04L 51/32; H04L 67/30; H04L 67/306; H04L 51/16
USPC .................................................. 709/203, 217
See application file for complete search history.

(56) References Cited

U.S. PATENT DOCUMENTS

| | | | |
|---|---|---|---|
| 7,010,534 B2 | 3/2006 | Kraft | |
| 8,150,913 B2 | 4/2012 | Cheah | |
| 9,519,925 B2 | 12/2016 | Crites | |
| 2005/0216295 A1 | 9/2005 | Abrahamsohn | |
| 2007/0078720 A1 | 4/2007 | Ravikumar et al. | |
| 2009/0063284 A1 | 3/2009 | Turpin et al. | |
| 2009/0222858 A1* | 9/2009 | Hjelm ............... G06F 17/30035 725/47 |
| 2009/0319359 A1 | 12/2009 | Soza et al. | |
| 2011/0280549 A1* | 11/2011 | Walker .................. H04N 21/00 386/240 |
| 2012/0158553 A1 | 6/2012 | Sudhidhanakul et al. | |
| 2013/0041897 A1* | 2/2013 | O'Donnell ........ G06F 17/30489 707/736 |
| 2013/0085842 A1 | 4/2013 | Morales et al. | |

* cited by examiner

*Primary Examiner* — Phuoc Nguyen
(74) *Attorney, Agent, or Firm* — Jeffrey Schox; Diana Lin

(57) ABSTRACT

Embodiments of a system and method for sharing content across a social network can include: receiving content (e.g., a content update) for a content channel (e.g., at a channel node of a set of remote channel nodes); assigning a content identifier to the content; transmitting the content with the content identifier to a user account associated with the content channel; and modifying the content channel with the content based on the content identifier.

19 Claims, 12 Drawing Sheets

SYSTEM AND METHOD FOR CONVERSATION DISCOVERY

CROSS-REFERENCE TO RELATED APPLICATIONS

This application claims the benefit of U.S. Provisional Application Ser. No. 62/327,241, filed on 25 Apr. 2016, and U.S. Provisional Application 62/434,846, filed on 15 Dec. 2016, each of which are incorporated in their entirety by this reference.

TECHNICAL FIELD

This invention relates generally to the social networking systems field, and more specifically to a new and useful system and method for content sharing in the social networking systems field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
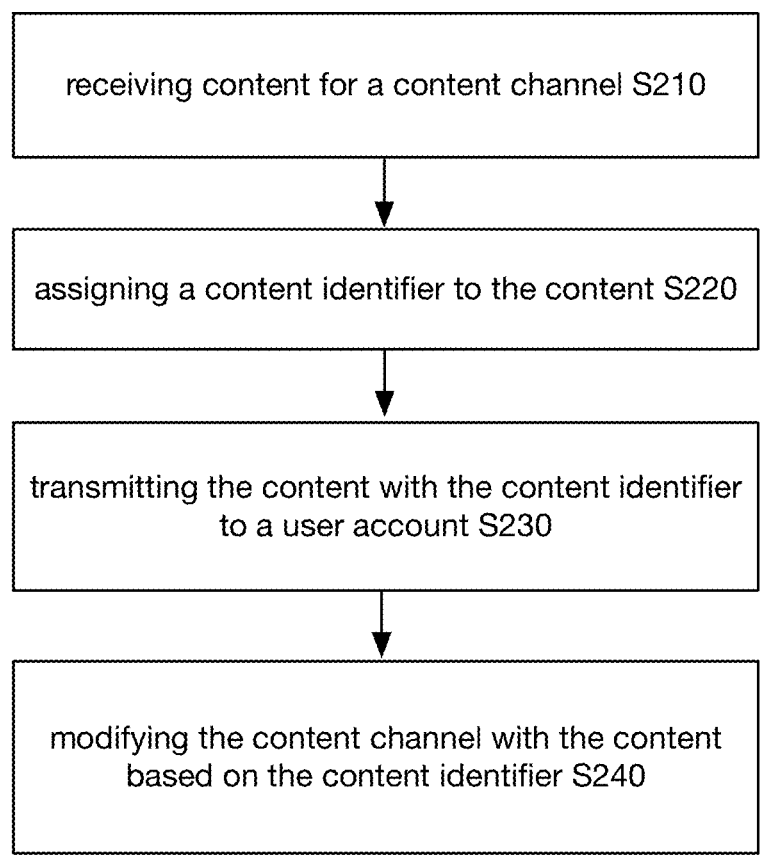
FIGS. 1A-1C are flow diagrams of embodiments of the method.
Figure 1B:
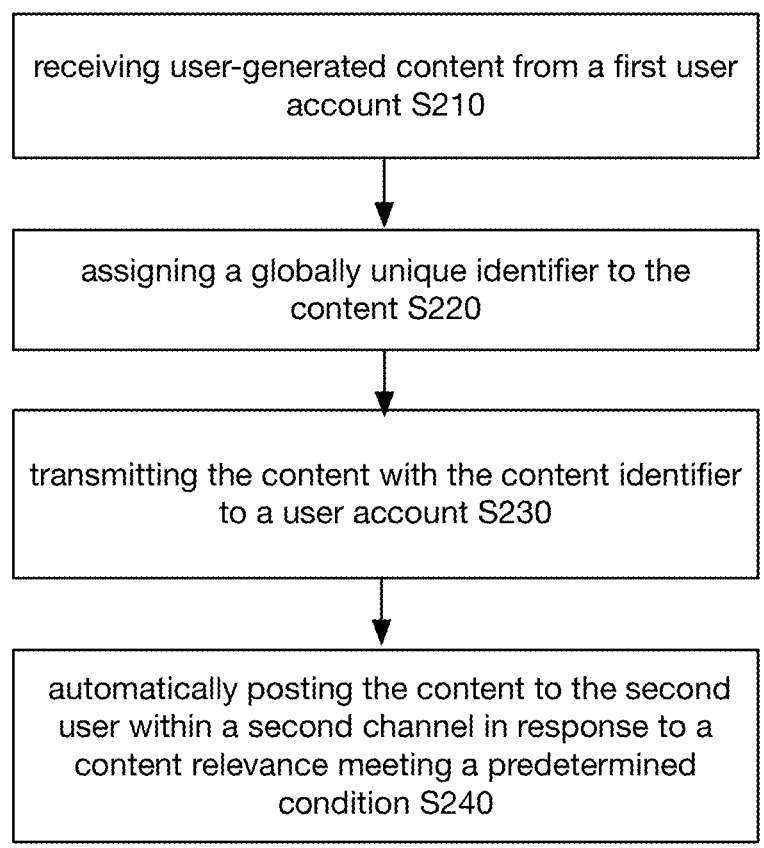
Figure 1C:
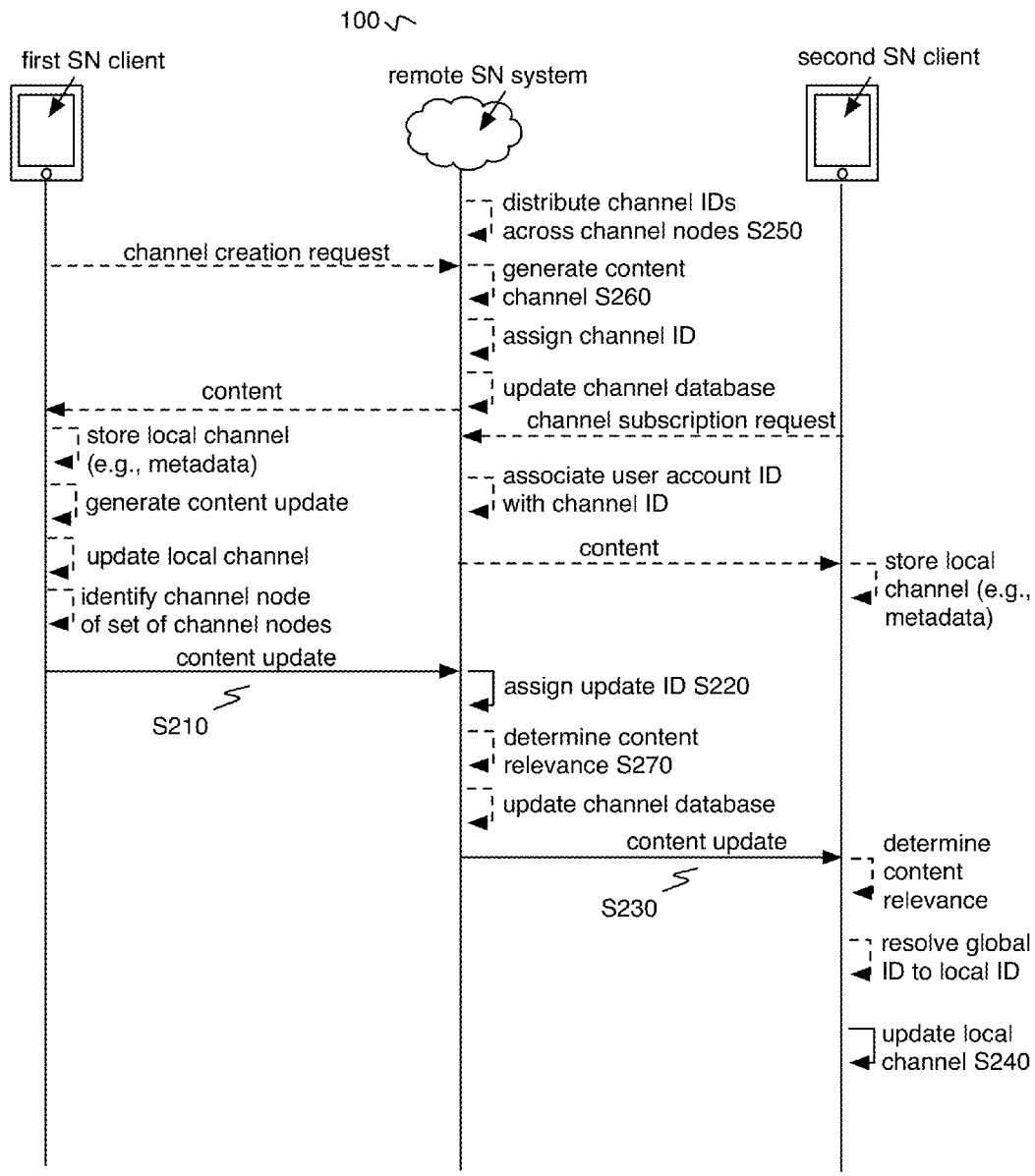

As shown in FIGS. 1A-1C, embodiments of a method 200 for sharing content across a social network (SN) can include: receiving content for a content channel S210; assigning a content identifier to the content S220; transmitting the content with the content identifier to a user account S230; and modifying the content channel with the content based on the content identifier S240.

Figure 2A:
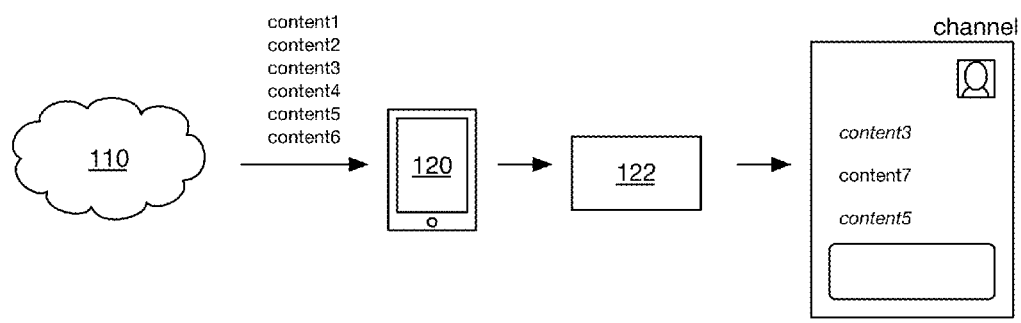
FIGS. 2A-2B are schematic representations of embodiments of the system.
Figure 2B:
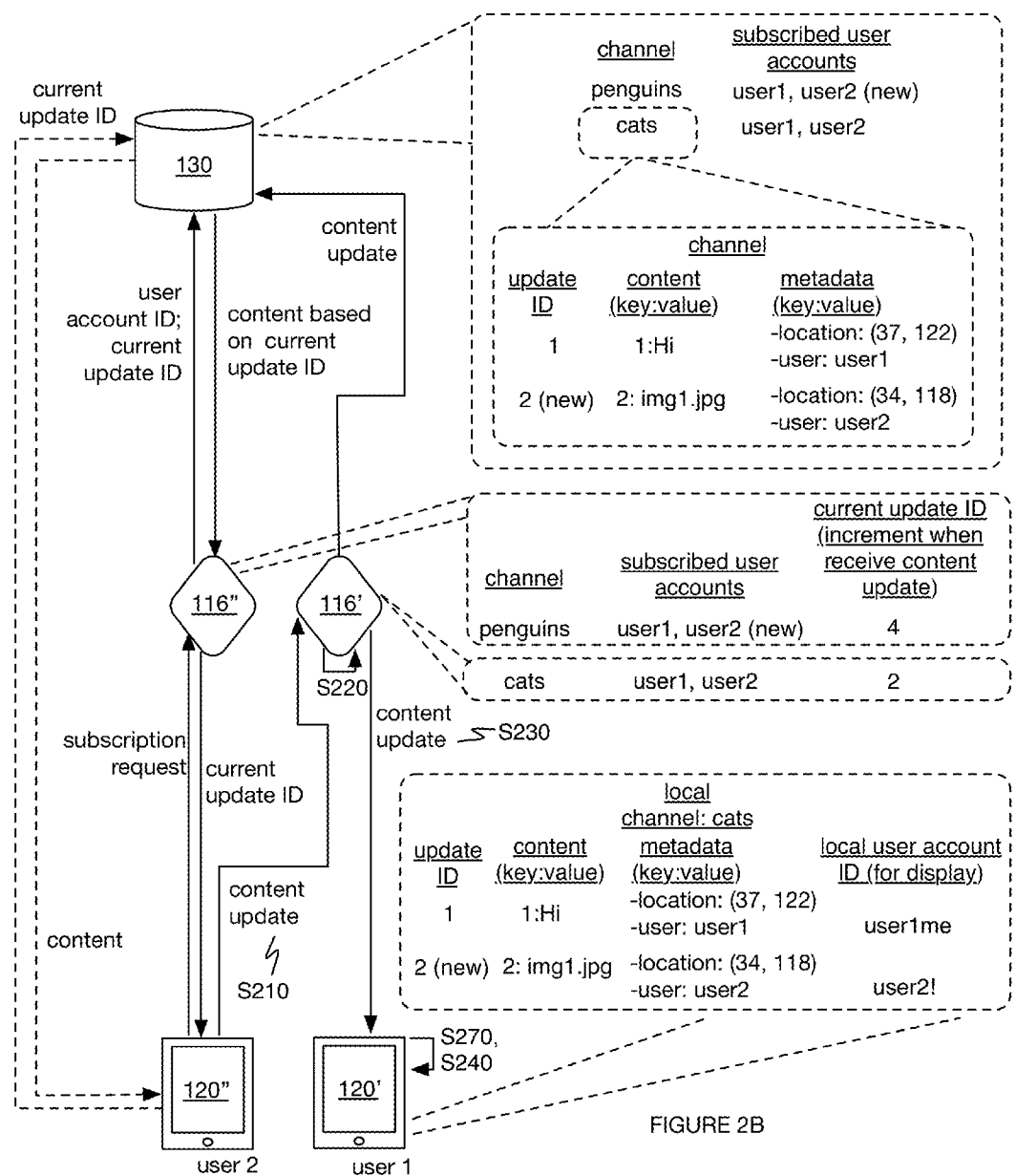

Embodiments of the method 200 are preferably implemented by the system 100, embodiments of which can include, as shown in FIG. 2A: a SN system including content channels associated with data objects (e.g., user accounts, content, etc.); and a set of SN clients 120 operating on a set of user devices. The system 100 can additionally or alternatively include: a channel database 130, object features, contextual pockets, and/or any other suitable components. In a specific example, as shown in FIG. 2B, the system 100 can include a distributed SN (e.g., fully distributed, pseudo-distributed, etc.).

The system 100 and method 200 can function to evaluate and present contextually relevant content (e.g., text, images, video, other media, etc.) to a user. The system 100 and method 200 can additionally or alternatively function to distribute functionality across a distributed SN system to confer improvements on network efficiency, processing speed, data protection (e.g., through data redundancy), content personalization, and/or other suitable aspects. However, the system 100 and method 200 can have any suitable functionality. One or more instances of the method 200 and/or processes described herein can be performed asynchronously (e.g., sequentially), concurrently (e.g., in parallel; concurrently on different threads for parallel computing to improve system processing ability for serving personalized content to user; etc.), in temporal relation to a trigger event, and/or in any other suitable order at any suitable time and frequency by and/or using one or more instances of the system 100, components, and/or entities described herein. However, the system 100 and/or method 200 can be configured in any suitable manner.

2. Benefits

Conventional social networking systems can suffer from several drawbacks. First, conventional systems can offer minimal passive discovery of relevant content, where users can only discover content posted by other social networking system users that they are explicitly connected to (e.g., through the respective social graph), or by actively searching for the relevant content. Second, conventional systems can offer minimal personalization due to constraints stemming from their computational architecture. Third, the design of conventional systems can detract from user experience, which can be limited in conferring user's the ability to efficiently and creatively share content. Embodiments of the system 100 and/or method 200 can confer technologically-rooted solutions to at least the challenges described above.

First, by automatically selecting and presenting content relevant to a user, the technology can enable a user to passively discover new content, new conversations (e.g., through the new content), new connections (e.g., through the new conversations), and/or other personalized content. The technology can further refine selection of relevant content by leveraging non-binary associations between different user accounts (e.g., a first and second user can be explicitly linked as friends, temporarily linked as respondents to the others' comments, weakly linked as viewers of the same conversation, etc.), where different association levels can weight the content relevance differently.

Second, the technology can enable a personalized user experience by resolving globally unique identifiers into locally unique identifiers (e.g., for user accounts, content channels, other data objects, etc.). For example, there can be multiple content channels or users with the same name (but different global identifiers), and each user can see their user or channel name as the "real" or "only" user or channel with that name.

Third, the technology can confer improvements in computer-related technology (e.g., in the fields of social networks, network efficiency, distributed computer systems, etc.) by facilitating computer performance of functions not previously performable. In a first example, the technology can leverage recent advances in distributed computing to efficiently serve personalized content to a plurality of users while protecting the associated data. In a second example, the technology can apply computer-implemented rules (e.g., feature engineering rules) for extracting content relevance features usable in determining content relevance of user-generated content to other users, and/or for other suitable purposes.

Fourth, the technology can confer technical solutions necessarily rooted in computer technology to overcome issues specifically arising with computer technology (e.g., issues associated with providing an organic user experience for interfacing with a digital social network; serving personalized digital content to users of a social networking application; etc.). In a first example, the technology can uniquely identify every piece of content generated within the social networking system (e.g., with a hash identifying the content and the parent channel). This can confer several benefits. First, when a snippet of the content ("chatter") is surfaced in a channel, the content itself can function as a hyperlink to the source channel (e.g., the parent channel) and/or source content (e.g., the content itself), thereby reducing the number of steps required to access the source channel. The hyperlink can additionally or alternatively link to the location within the channel proximal the content, to provide context around the content. Second, uniquely identifying every piece of content can allow the content to be easily changed by secondary users ("remixed") while tracking the source content from which the remixed content was derived (e.g., parent version of the content). Third, by tracking the content dissemination path (e.g., through chatter, resultant actions taken on the chatter, remixing, etc.), the technology can generate a rich data source ("hyperconversation"), which can be used to train content relevance modules, to determine auto-complete suggestions relevant to a user, to determine recommendations relevant to a user (e.g., restaurant recommendations), and/or used in any other suitable manner.

In a second example, the technology can automatically recognize a set of wildcards, where each wildcard can automatically trigger a predetermined action. In a first specific example, an "@user" reference can automatically send the surrounding content to a second user account, locally identified by an SN client as "@user" but globally identified by a globally unique identifier assigned to the second user account (e.g., where the SN client resolves the local identifier into the globally unique identifier). In a second specific example, a "#channel" reference can automatically open or create a channel, locally identified by "#channel" but globally identified by a globally unique identifier assigned to the channel (e.g., where the client resolves the local identifier into the globally unique identifier). In a third specific example, a "#channel/subchannel" can automatically open or create a conversation sub-channel ("subchannel") that is associated with a parent channel ("channel"), where the sub-channel can inherit properties of the parent channel (e.g., rules, users, other parameters, etc.).

In a third example, the technology can allow objects (e.g., connected systems) to have a user account, such that the objects can be treated as users. This can allow commands to be directly sent to the object, instead of requiring an intermediary translation system (e.g., IFTTT). Further, directing commands to objects can enable object linking (e.g., through composing a command linking the output of a first object to the input of a second object). For example, composing the command "/pdf (#user/book/chapter 1, #user/book/chapter 2)" can generate a pdf from the content in the "chapter 1" and "chapter 2" subchannels of "#user/book". However, the technology can enable organic action performance in any other suitable manner.

Fifth, the technology can confer an inherent level of data protection (e.g., content privacy, security, redundancy, etc.) and network efficiency by leveraging a fully- or pseudo-distributed version control system. As such, the technology can amount to an inventive distribution of functionality across a distributed social network including a set of remote channel nodes (e.g., for receiving content updates for a channel, and transmitting the content updates to user accounts subscribed to the channel; etc.), different SN clients (e.g., associated with and executed by different user devices for storing and updating local channels with content updates, where the local channel functionality attributed to the SN clients can enable smaller content updates to be transmitted across the social network as opposed to larger sets of content associated with a channel; etc.), channel databases (e.g., for providing data protection), and/or other suitable components.

Sixth, the technology can confer temporal relevance by selectively decaying links (e.g., associations) between user accounts over time and/or location. For example, content from a channel associated with a physical location (e.g., a second user device's physical location) can be deemed less relevant with increased user device distance away from the physical location. In a second example, content from a channel can be deemed less relevant with increased user account neglect (e.g., as a function of time since last user account participation or viewership of the channel). In a third example, content from a second user account can be deemed less relevant with increased user account neglect of the second user account. However, the links can be otherwise decayed as a function of a predetermined parameter. The technology can additionally confer temporal relevance by selectively expiring (e.g., deleting), summarizing, or otherwise shrinking the amount of past content that is stored. This can confer the additional benefit of reducing the amount of memory required to store historic content. The selective decay of information can be performed per user account, per channel, or for any other suitable data structure, which can further tailor the social networking system experience to the user's preferences. The technology can, however, provide any other suitable benefit(s) in the context of using non-generalized computer systems for serving content in a social network.

3. System

The SN system 110 functions as an online platform for serving personalized content to users of the SN. In a specific example, the SN system no can facilitate the receipt of a content update from a first user (e.g., a content creator; etc.) for a content channel; process the content update (e.g., assign a global content identifier; evaluate content relevance; etc.); and transmit the content update to a second user (e.g., a content consumer associated with a user account subscribed to the content channel; etc.). The SN system no preferably includes a remote computing system, but can additionally or alternatively be implemented in any suitable form (e.g., online service, platform, application, website, etc.).

The SN system 110 preferably stores and processes data objects, which can function to enable content sharing between users of the SN. The data objects can include: content, content channels, content sub-channels, metadata (e.g., geographic locations, tags, etc.), user accounts, associated identifiers, associations between objects, computer-implemented rules (e.g., executed by a content relevance module 122, a subscription request module, a subscription fulfillment module 114, etc.), and/or other suitable types of data. Each data object is preferably assigned a global identifier (e.g., by the SN system 110) identifying the data object within the SN system 110, and can additionally or alternatively be associated with one or more local identifiers (e.g., local to a device, user account, channel, or other object; specific to an association with another object, etc.) or be associated with any other suitable identifier or data. In a first variation, data objects can be associated with a global identifier and local identifiers. In an example, the SN system 110 can resolve global identifiers into local identifiers (e.g., which can be transmitted with content updates to SN clients 120). In a second variation, data objects can be associated exclusively with a global identifier without associations with local identifiers. Additionally or alternatively, data objects can be associated with any suitable local identifiers (e.g., local identifiers without association with global identifiers, etc.).

Figure 3:
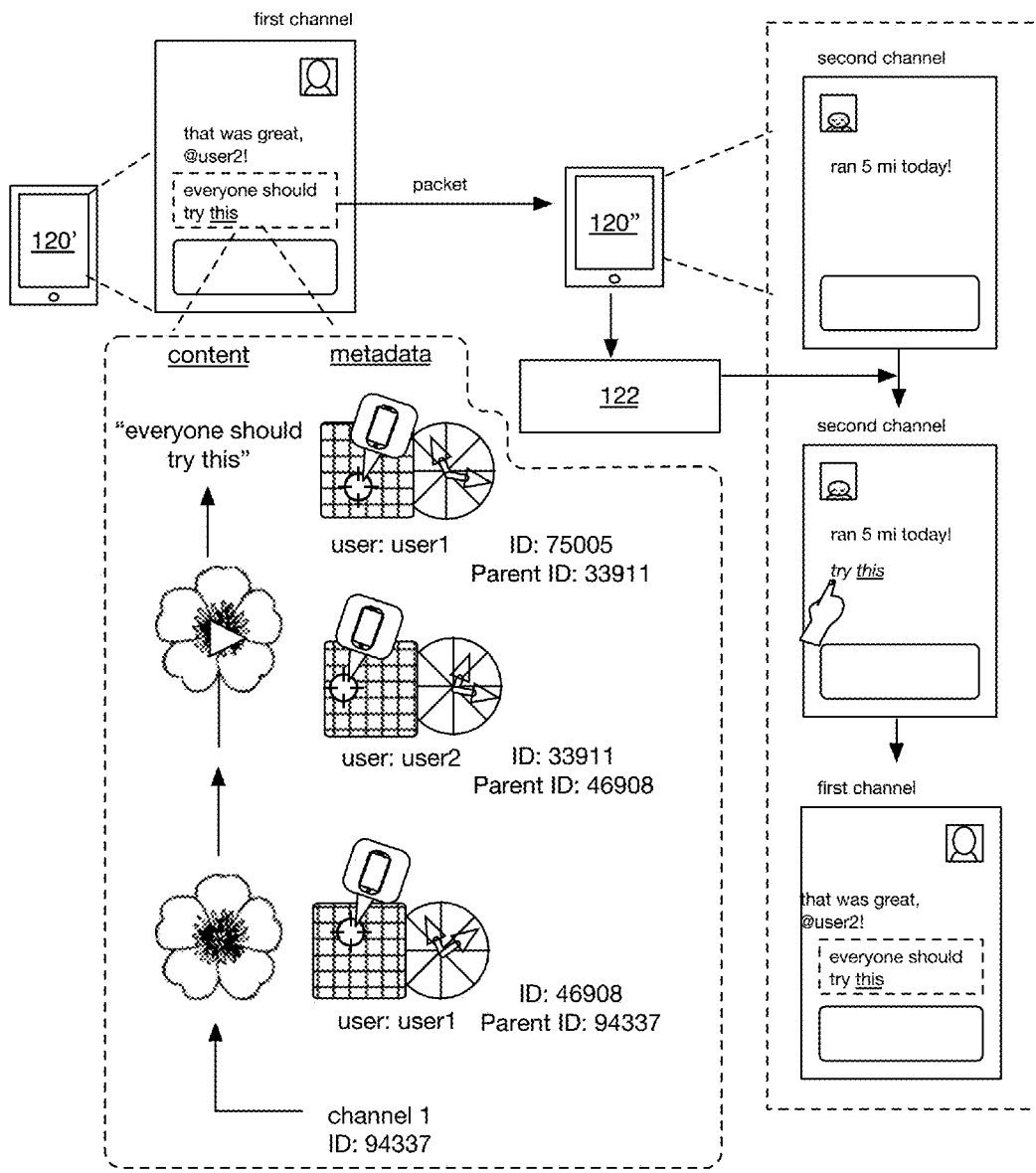
FIG. 3 is an example of content presentation based on relevance.

Different data objects can be associated with different identifier types, having different lengths, alphanumeric patterns, and/or any other suitable parameter, but can alternatively share one or more identifier types. In a first variation, the identifier can link to the data object (e.g., be used as, or in, a URI). For example, the identifier for a portion of content can link to the source channel, a global channel containing the content (e.g., to the channel generally, to the position of the content within the channel, etc.), to a copy of the source channel stored on a subscriber's client, and/or to any other suitable source for the source content. In a second variation, as shown in FIG. 3, the identifier for a data object can be associated with and/or transmitted with identifiers for parent data objects (e.g., an original data object that was modified; a content channel from which the data object originates and/or is otherwise associated; a user account associated with the content creator of the data object; etc.). In a first example, when new content is added to a content channel, the identifier for the new content can be sent (e.g., broadcast, retrieved, pushed, etc.) with the identifier for the channel version that the new content was posted to. In a second example, when a user modifies existing content, the identifier for the modified content can be accompanied with the identifier (e.g., a hyperlink to the underlying content) for the underlying content that was modified. Additionally or alternatively, the SN system 110 can leverage any suitable types of identifiers to track and/or control data object versioning in any suitable manner (e.g., based on timestamps). However, data objects can be configured in any suitable manner.

Data objects preferably include content, which function to communicate information between user accounts (e.g., for sharing; as currency; etc.). The content can be entered by the user into the SN client 120 (e.g., be user-generated content entered at an entry field through a tool or widget provided by the SN client), copied or referenced from a secondary source (e.g., source external the SN; dragged from a secondary channel; prior channel history; etc.), automatically retrieved by the SN client (e.g., based on a URI or link), automatically generated (e.g., by a bot or other software; generated from a plurality of other content), modified (e.g., associated with a content identifier), and/or otherwise determined. The content can include: text (e.g., textual posts, stories, etc.), references (e.g., URIs, links to articles, etc.), images (e.g., emojis), animations (e.g., .gifs), videos (e.g., where the videos can be automatically converted to predetermined formats, such as .gifs), audio, haptic content, games, interactive content, augmented reality content, virtual reality content, SN objects (e.g., content channels, subchannels, etc.), and/or any other suitable types of content. The content can be original content (e.g., entirely generated by the user), derivatory content (e.g., partially generated by the user, based on a prior piece of content, etc.), and/or have any other suitable source. The content preferably includes content metadata, which can include: associated identifiers (e.g., user account identifiers identifying user accounts that created and/or modified the content, and/or are otherwise associated with the content; parent data object identifiers; channel identifiers identifying content channels to which the content is posted, and/or content channels that are otherwise associated with the content; local identifiers such as avatars and/or usernames for user accounts; etc.), structural metadata (e.g., indicating parent-child relationships and/or other relationships between the content and other data objects; etc.), title, author, tags, keywords, subject, references (e.g., self-referential hyperlinks; hyperlinks to data objects associated with the content; references to the source content from which the content is derived; etc.), permissions (e.g., content permissions; channel permissions for associated content channels; moderator abilities for regulating the content and/or associated content channels), temporal indicators (e.g., timestamps associated with generation of, receipt of, and/or posting of content; etc.), secondary modifications to content (e.g., change an avatar to have a gold outline; enable looping for an avatar video, etc.), and/or any other suitable metadata. However, content can include any suitable components.

Content is preferably updated by content updates (e.g., media updates), which function to modify content. Content updates preferably include the data required to update the content from a first state (e.g., original state) to a second state (e.g., modified state), such as data indicating the differences between the first and second states (e.g., as opposed to data coding for the entirety of the content in the second state). In a first example, the content can include content metadata represented in a set of metadata key-value pairs (e.g., where the key indicates the type of metadata and the value indicates corresponding metadata values, etc.), and the content update can include an update to a metadata key-value pair of the set (e.g., stored by the SN client 120 at a local channel). In a second example, the content update can include pixel positions and corresponding updated pixel values for updating a subset of pixels for an image. In a third example, the content update can include a single content piece (e.g., a user-generated video) that can be transmitted to identified SN clients 120 (e.g., subscribed to a content channel for which the content piece is uploaded, etc.) for updating a locally stored channel at the user device, rather than having to transmit a set of historical content pieces posted to the content channel when an SN client 120 accesses the content channel. In a fourth example, the content update can include an update to a local identifier (e.g., stored at a user device). However, the content updates can include any suitable content and/or updates in any suitable state.

Data objects preferably include content channels (e.g., media channels), which function to organize and/or track content. The content channels can include parent channels, child channels (e.g., sub-channels), and/or any other suitable hierarchical channel organization. In an example, the SN system 110 can create a sub-channel of a user account (e.g., "users/channels", where the user can control permissions and/or otherwise manage the channel), where the sub-channel can share an identifier (e.g., local identifier) with a global channel (e.g., "#channel1"). However, content channels can be associated with any suitable components. Content channels are preferably identified by channel identifiers (e.g., global, local, etc.) stored by the SN system 110, but can be identified by any suitable identifiers stored by any suitable component.

Each content channel can be associated with a set of channel parameters, where the channel parameters can specify the content channel's: user account permissions (e.g., who can join, view, comment, etc.), visual presentation, content organization (e.g., time-series, randomized, etc.), content sharing (e.g., to other content channels, from other content channels), subject matter permissions, content type permissions, automated software (e.g., bots), parameter editing permissions (e.g., moderator), associated user accounts (e.g., members), associated content channels (e.g., parent channels, child channels, community channels, etc.), and/or any other suitable aspects. The channel parameters can be shared across multiple channels (e.g., global), specific to the content channel, or otherwise shared. In a first example, a first content channel can be private, where only user accounts on the membership list can view and/or edit the content channel. In this example, content posted to the content channel is preferably not transmitted to secondary channels. Channel permissions can include a content-specific permission level (e.g., permitting content within a certain date range to be viewable, permitting selected content to be viewable, etc.), where the content-specific permission levels can be global, can vary per user account (e.g., channel members can only view content generated since they joined; new channel members cannot view old content, generated before they joined, that mentions them or any connections within a predetermined degree of removal; etc.). In a second example, the content channel can include a set of rules for content use as virtual currency, where the rules can specify the types of content (e.g., gifs, audio media stream, visual media stream etc.) that can be used as currency, price for purchasing the content, and/or any other suitable set of rules. However, channel parameters can be configured in any suitable manner.

Data objects preferably include user accounts, which function to organize identities for serving personalized content. Each user account is preferably associated with one or more identities (e.g., users, individuals, businesses, etc.). Each identity can be shared by multiple accounts, be associated with a single account, be associated with accounts sharing a common parameter value (e.g., location within a predetermined geofence, common preferences, etc.), and/or be associated with any suitable number of accounts. For example, an identity associated with a café can be shared by multiple barista accounts, where each barista account is associated with a single barista. Each identity can be identified by a local and global identifier, by a global identifier only, by a local identifier only, and/or by any other suitable identifier.

In a first variation, a user account can be associated with a set of permissions (e.g., controlled by an identity owner, etc.). Upon access to the user account (e.g., upon login to the user account), a user can access all of the associated identities, a portion of the associated identities, and/or any other suitable subset of the identities. In a second variation, user accounts can be associated with identifiers. For example, user account identifiers are preferably associated with channel identifiers identifying content channels to which the corresponding user accounts are subscribed. In a third variation, user accounts can be associated with account parameters (e.g., indicative of user interests). The account parameters can be automatically determined from: user actions (e.g., selected content channels, content generation frequency, content generation times, etc.), content associated with the user account (e.g., content generated by the user account, responded to by the user account, shared by the user account, remixed by the user account, etc.), user accounts associated with content channels associated with the user account, user device location (e.g., current, historic, etc.; as determined by the SN client), user device proximity to secondary user devices (e.g., as determined through device-to-device connections via short-range communication protocols, such as BLE, through third-party analysis, such as through the devices' GPS locations, etc.), and/or from any other suitable information. However, user accounts and corresponding user account identifiers can be associated with any suitable data (e.g., content identifiers identifying content posted by the user account).

The SN system 110 can store: content generated by each user account, user login information (e.g., concurrently conferring access to one or more user accounts), user account preferences, user account links or associations, content relevance module(s) 122 for a user account, and/or any other suitable information for the user account. All or a portion of the user account information can be permanently stored, temporarily stored (e.g., selectively deleted as a function of a predetermined parameter), and/or stored for any other suitable duration. However, user accounts can be configured in any suitable manner.

The SN system no can additionally or alternatively include a subscription fulfillment module 114, which can function to process subscription requests to content channels. In a first variation (e.g., a centralized SN system variation), the subscription fulfillment module 114 can process subscription requests received by the SN system 110 for the set of content channels managed by the SN system 110. In a second variation (e.g., a distributed SN system variation), the subscription fulfillment module 114 can include a set of subscription fulfillment submodules, each configured to process subscription requests for different subsets of content channels (e.g., where a channel node from a set of channel nodes can include a subscription fulfillment submodule configured to process a subset of content channels managed by the channel node; etc.). However, functionality associated with the subscription fulfillment module 114 can be otherwise distributed across components (e.g., SN clients 120) of the system 100.

The subscription fulfillment module 114 preferably transmits a subscription confirmation to the requesting user account (e.g., in response to receiving the subscription request), but can transmit a subscription confirmation to any suitable entity (e.g., a user account that created the content channel, a user account that is administering the content channel, etc.). The subscription confirmation can include: content (e.g., historical content posted to the content channel), content identifiers (e.g., an update identifier), data objects associated with the content channel (e.g., a set of user account identifiers identifying user accounts subscribed to the content channel), temporal indicators (e.g., timestamps associated with the subscription request and/or confirmation), and/or any other suitable data. In a first example, the subscription fulfillment module 114 can be configured to associate a content update with an update identifier associated with a set of historic update identifiers identifying a set of historic content updates for a content channel; receive a subscription request to the content channel from an SN client; and transmit the update identifier (e.g., in a subscription confirmation) to the SN client 120 in response to receiving the subscription request, where the SN client 120 is configured to receive a set of content based on the update identifier, the set of content generated from the content update, and the set of historic content updates. In a second example, the update identifier can be in a sequence (e.g., numeric sequence, character sequence, alphanumeric sequence, etc.) with the set of historic update identifiers (e.g., where the update identifier identifies the most current update and sequentially follows the set of historic update identifiers), where the SN client 120 is configured to receive the set of content based on the update identifier and the sequence (e.g., where the SN client 120 receives the update identifier and retrieves the set of content based on querying the channel database 130 with the update identifier, and where the channel database 130 can store the sequence of update identifiers and associated content updates; etc.). In a third example, the SN system no and/or SN client 120 can evaluate content relevance of the set of content prior to content transmission (e.g., when the content relevance satisfies a threshold condition) associated with a subscription request. Additionally or alternatively, the subscription fulfillment module 114 can be configured in any suitable manner. However, the SN system no can be configured in any suitable manner.

The SN client 120 functions to operate on a user device to process and present content for users. The SN client can be an application (e.g., native application, web application, mobile application, etc.), operating system, browser, and/or any other suitable type of portal. The SN client 120 preferably communicates with the SN system no to facilitate content sharing. In a first variation, the SN client 120 can transmit content (e.g., content updates) and/or other suitable data objects to the SN system no. In a specific example, the SN client 120 can be configured to receive content from a user account (e.g., an input at an entry field associated with a content channel), process the content (e.g., associate the content with identifiers such as a user account identifier identifying the user account that generated the content; associate with parent identifiers; etc.), and transmit the content to the SN system no. In a second variation, the SN client 120 can receive content and/or other suitable data objects from the SN. For example, the SN client 120 can be configured to receive content updates, from the SN system 110, for content channels to which user accounts associated with the SN client 120 are subscribed. Additionally or alternatively, the SN client 120 can communicate with any suitable components of the system 100 for any suitable purpose.

A SN client 120 running on the user device preferably resolves the global identifier into one or more local identifiers, such that each data object is identified locally by their preferred name (e.g., handle). For example, the SN client 120 can be configured to receive content with a global user account identifier; map the global user account identifier to a local user account identifier (e.g., stored at the user device); and present the local use account identifier with the content at the user device. Disambiguations can be handled automatically (e.g., based on a set of predetermined rules), selected by the user account, selected by the client, or otherwise handled. In a specific example, the client can automatically append an alphanumeric sequence (e.g., number, greek letter, etc.) to the end of collided names, starting at the second person of the same name encountered (e.g., where preference is given temporally). In a second specific example, the client can automatically assign a preference to each secondary user account (and/or identity) based on: the frequency of interaction between the user account (and/or identity) and secondary user account, whether the secondary user's name appears within the user account's contact list, or based on any other suitable parameter. Additionally or alternatively, the SN client 120 can resolve one or more local identifiers into a global identifier (e.g., based on a combination of local identifiers, metadata associated with the local identifiers, etc.). However, the SN client 120 can be configured to resolve identifiers in any suitable manner.

Additionally or alternatively, as shown in FIG. 3, the SN client 120 can include a content relevance module 122, which can function to determine content relevance of content to user accounts associated with the SN client 120 (e.g., where the content relevance can determine if and how the content is presented to the user accounts), and/or can function for any suitable purpose. Content relevance modules 122 can be customized on a global basis, channel basis (e.g., a first content relevance module for content channels related to animals, and a second content relevance module for content channels related to food, etc.), user account basis, other data object basis, and/or any suitable basis. For example, the content relevance module 122 can be customized for a user account and configured to execute on the user device to determine a content relevance of a content update to the user account in response to receiving the media update, and where the SN client 120 is configured to present the content update to the user account (e.g., updating a local channel stored at the user device with the content update) in response to the content relevance satisfying a threshold condition. In a specific example, the content relevance module 122 can be configured to obtain a set of computer-implemented rules (e.g., stored at the user device) and defining the content relevance as a function of a user device parameter (e.g., location, device type, operating system, sensor measurements, etc.); obtain (e.g., locally obtain) the user device parameter from the user device; and execute (e.g., on the user device) to determine the content relevance by evaluating the user device parameter against the set of computer-implemented rules. Additionally or alternatively, computer-implemented rules can be leveraged for any suitable purpose (e.g., fulfilling subscription requests; facilitating data redundancy; distributing functionality across the network, such as distributing channel identifiers across nodes 116; etc.). In variations, the content relevance module 122 can additionally or alternatively be stored and executed at the SN system 110. However, the content relevance module 122 can be configured in any suitable manner.

The SN client 120 can additionally or alternatively include a subscription request module, which functions to collect subscription requests from user accounts and to transmit the subscription requests to the SN system 110 (e.g., an appropriate SN system node 116 including a subscription fulfillment module 114 for the content channel to which the subscription request is directed, etc.). The subscription request module can transmit subscription requests to the SN system 110 in real-time, in batch (e.g., in a multiplex manner), and/or at any suitable time and frequency. For example, the SN client 120 can be configured to receive a set of subscription requests from the user account for a set of content channels corresponding to a first set of channel identifiers stored at a channel node of the SN system 110 and a second set of channel identifiers stored at a supplemental channel node of the SN system 110; group a subset of the set of subscription requests into an aggregate request based on the first set of channel identifier; and transmit the aggregate request to the channel node. However, the SN client 120 can be configured in any suitable manner.

The system 100 can include a distributed SN (e.g., pseudo-distributed, fully-distributed), including distributed functionality across the SN system 110, SN clients 120, and/or other suitable components in any suitable manner. In a first variation, the system 100 can include a pseudo-distributed SN including a plurality of SN clients 120 connected to one or more nodes 116 (e.g., different remote computing systems) of the SN system 110. The nodes 116 can function as repositories and/or trackers for the data objects. Nodes 116 preferably include channel nodes configured to manage a subset of content channels from a set of content channels included in the SN system 110. In a first example, channel nodes 116 can store a subset of distributed channel identifiers identifying content channels managed by the respective channel node, where the channel node can store associated user account identifiers, content identifiers (e.g., an update identifying the most current content update, etc.), and/or any other suitable data object. In a second example, each channel node can include a different subscription fulfillment submodule configured to fulfill subscription requests for content channels managed by the channel node. In a third example, each channel node can be configured to receive a content update for a content channel, process the content update (e.g., associate identifiers, evaluate content relevance, etc.), and transmit the content update to user accounts identified by user account identifiers stored by the channel node in association with the content channel. As such, a node 116 can act as a repository for a given amount of content channels and/or metadata (e.g., where a given content channel is handled by a single node), enabling the number of content channels and/or metadata to be increased by increasing the number of nodes 116 (e.g., thereby improving scalability of the SN system 110). Additionally or alternatively, the SN system 110 can include any suitable types of nodes 116 (e.g., content relevance nodes where content relevance functionality is distributed across the nodes; subscription fulfillment nodes; etc.).

In examples, nodes 116 can retrieve channel content and/or associated metadata by using a key/value paradigm. Under the key/value paradigm, channel content can be retrieved in batches. In an example, for a given key, a single piece of content can be retrieved (e.g., the content with the highest sequence number based on timestamp), where channel updates paired with a key can be aggregated into a single update in the channel history. In a specific example, a channel node can transmit a subscription confirmation with a sequence number to an SN client 120 (e.g., an SN client 120 that transmitted a subscription request to the node), the subscription confirmation including data usable to collect content associated with the channel up to but not including the sequence number (e.g., where the subscription confirmation includes the content; where the subscription confirmation includes an update identifier that can be used by the SN client 120 to retrieve the content from a channel database 130, etc.).

SN clients 120 can store and update local channels (e.g., corresponding to channels managed by the nodes 116) at user devices. Local channels can function as a locally stored repository for data objects (e.g., content, local identifiers, data objects shared across the local channels and the content channels to enable data redundancy, etc.) associated with content channels to enable network efficiency (e.g., in relation to content updates transmitted across the pseudo-distributed SN), personalization (e.g., with local identifiers), and/or other suitable features. SN clients 120 can download the latest version of the content channel (e.g., parent channel version), update the content channel by posting new content to the conversation stream, and send the new content to the node. In an example, SN clients 120 can act as couriers for transmitting messages (e.g., subscribing or unsubscribing to a content channel, posting to a content channel, multiplexing multiple subscriptions to a content channel, etc.) and receiving messages (e.g., subscription confirmations, event updates, etc.) from one or more nodes 116 (e.g., which act as a central repository for one or more content channels and/or metadata). In this example, state changes for the client can be in response to receiving messages from nodes 116. In a first specific example, the SN client 120 can be configured to store a local channel at a user device associated with a user account; store an association at the user device between the local channel, the content channel (e.g., channel identifier) corresponding to the local channel, and a channel node (e.g., managing the content channel); receive content for the content channel from the user account; update the local channel with the content; select the channel node from the set of channel nodes to receive the content update, based on the association; and transmit the content update to the channel node (e.g., in response to updating the local channel). In a second specific example, the SN client 120 can be configured to receive a content update for a content channel from the channel node; and update a local channel (e.g., corresponding to the content channel) with the content update. Content updates can additionally or alternatively include a reference to the parent channel version, where the node 116 selectively merges the new content into the content channel based on the parent channel version. For example, the node 116 can merge a first piece of content, referencing a first parent channel version, into the content channel at a point temporally preceding a second piece of content that references a second parent channel version after the first parent channel version. The SN clients 120 preferably store and manage (e.g., add, remove, etc.) the lists of secondary clients (or user accounts) associated with each client (or user account), the content relevance modules 122 for each user account, and/or any other suitable information specific to the user account, but other components (e.g., nodes 116) can alternatively or additionally store the user account information. However, the pseudo-distributed SN system can be configured in any suitable manner (e.g., with nodes 116 having analogous functionality to the fully distributed SN system, centralized SN system, the SN system 110 generally, and/or other components of the system 100 for any suitable purpose (e.g., distribution of functionality in relation to contextual pockets, object features, extensions, applications, other data structures, etc.).

In a second variation, the SN can include a fully distributed SN, formed from a plurality of networked SN clients 120. Using a distributed system can add an additional layer of data security (e.g., where users must be part of the client cluster to access content), add redundancy (e.g., where each client can locally store a version of the content channel), or confer other benefits. The clients are preferably individual instances of the social networking system application, each running on a different user device. All of the social networking system data (e.g., content, content relevance modules 122, user account associations, content channels, etc.) can be stored across the client plurality (e.g., user device population). For example, SN clients (e.g., primary clients) can access the data stored by other SN clients (e.g., secondary clients) when the primary client (or user account logged in through the primary client) is associated with the secondary client, where the primary client stores the list of associated secondary clients. In operation, when a user uses the primary client to post new content within a content channel (e.g., locally saved by the primary client), the client can send the new content to secondary clients within the list. The new content can be globally identified by a globally unique identifier (e.g., hash), and additionally include a reference to the global identifier for the channel version that the user modified (e.g., parent channel identifier). The secondary clients can receive the new content, determine the new content's relevance to their respective users, and selectively present the new content in a content channel.

In a first example, a secondary client can receive the new content, determine that the second user account (e.g., hosted by the secondary client) is viewing a version of the same channel, and merge the new content into the local version of the content channel based on the parent channel identifier. The process can be reciprocated when the second user account responds to the previously-new content. In a second example, a secondary client can receive the new content, run the new content through a content relevance module 122 tailored to the second user account (e.g., locally stored on the secondary client), and, in response to determination that the new content is relevant to the second user account, select a portion of the new content and merge the selected portion into a local version of a second channel currently engaging the second user account. The selected portion can additionally or alternatively be a hyperlink to the source channel. In response to selection of the hyperlink, the secondary client can automatically retrieve content for the source channel from the source client and/or other clients associated with the content channel (e.g., where the other clients are received from the source client). The secondary client can additionally add the source client and/or other clients (or respective user accounts) associated with the content channel to the local list of associated clients or user accounts. In a third example, a secondary client can receive a key (e.g., a singleton message with some metadata, including a link to the source channel) from a first user account. The key can enable the secondary user account on the secondary client access to join a private group (e.g., the same or different channel from the source channel), confer write access to a big public channel to the user account and/or identity, or give the user account and/or identity any other suitable set of permissions. However, the fully distributed SN system can be structured and operated in any other suitable manner.

In a third variation, the system 100 can include a centralized SN, where all information can be stored by a remote SN system 110 (e.g., remote computing system) including one or more networked servers. However, any suitable functionality (e.g., described in relation to any components) can be distributed across the components of the system 100 in any suitable manner.

As shown in FIGURE, 2B, the system 100 can additionally or alternatively include a channel database 130, which functions to store data objects retrievable by the components of the system 100. The channel database 130 is preferably configured to wirelessly communicate with the SN system no (e.g., to store and update channels, associated content, associated identifiers, etc.), but can additionally or alternatively communicate with SN clients 120 (e.g., to receive and store local identifiers, etc.) and/or any other suitable components. In an example, the system 100 can include a remote channel database 130 storing a global channel corresponding to a content channel (e.g., a current version of the content channel) and including content (e.g., media, content metadata, etc.), where the SN system no (e.g., a channel node managing the content channel) is configured to update the global channel at the remote channel database 130 with a content update in response to receiving the content update, and to transmit the content update to a user account in response to updating the global channel. The remote channel database 130 can store the global channels for all channels, a subset of the channels within the system, or store global channels for any suitable set of channels. The remote channel database 130 can include one or more remote computing systems (e.g., servers), wherein multiple remote computing systems can store redundant or non-redundant data. The global channels can function as a source of truth (e.g., for conflict resolution), as channel node backup, store conflicting versions of the same channel, or function in any other suitable manner. However, the channel database 130 can be configured in any suitable manner.

The system 100 can optionally include object features, which can function to confer a characteristic (e.g., a predefined functionality) upon data objects. An object feature can be associated with a data object by placing the object feature in the data object's contextual pocket, by linking the data object with the object feature, by placing the object feature within the data object (e.g., as content within a content channel), or otherwise associating the object feature with the data object. Object features can include: a predetermined block of code, an icon or token associated with a channel characteristic, and/or have any other suitable form factor. Characteristics conferred or controlled by the object feature can include: formatting, permissions, user actions, channel actions, or any other suitable channel characteristic. In a first example, the formatting feature can randomly reorder the content within the content channel. In a second example, the object feature can be a .gif filter that applies a predetermined filter to a .gif (e.g., any .gifs posted by a user account). In a third example, the object feature can function as a security key, where only user accounts with the object feature can see content secured by the object feature. However, the object feature can have any other suitable characteristic.

The object features can be made by and/or distributed by user accounts and/or any suitable entity. The object features can be obtained by user accounts through a marketplace, by copying the object feature from a feature source (e.g., another content channel, etc.), and/or otherwise obtained. In one variation, different object features can have different copying permissions. For example, a first object feature can have restricted copying permissions, such that the SN includes a limited number of the first object feature, while a second object feature can have unrestricted copying permissions, such that user accounts can make unlimited copies of the second object feature. The object features associated with a data object can be executed at any suitable frequency (e.g., continuously) and time. The object feature can affect the data object's parameters for all user accounts, for a subset of user accounts, or for any other suitable set of user accounts. Conflicts between object features associated with a common data object can be resolved based on time (e.g., last object feature takes priority), user preference, community popularity, or otherwise resolved. However, the object features can have any other suitable set of parameters and be used in any other suitable manner.

Figure 8:
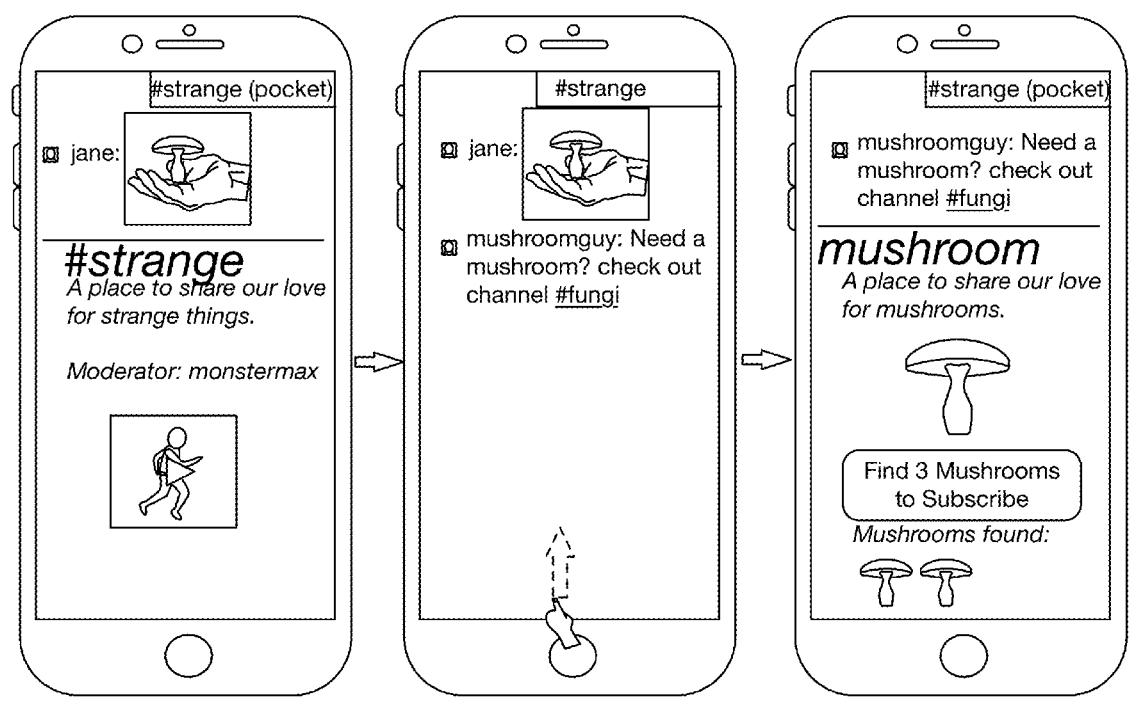
FIG. 8 is an example of a contextual pocket.

As shown in FIG. 8, the system 100 can additionally or alternatively include contextual pockets (e.g., included in and/or otherwise associated with content channels), which function to personalize and/or add functionality to a content channel. Contextual pockets can include any suitable data objects (e.g., subchannels, content distinct from the parent channel, games associated with subscription to the content channel, applications, permissions, etc.). However, contextual pockets can be configured in any suitable manner.

4. Method

As shown in FIGS. 1A-1C, embodiments of a method 200 for sharing content across a social network can include:

receiving content for a content channel S210; assigning a content identifier to the content S220; transmitting the content with the content identifier to a user account S230; and modifying the content channel with the content based on the content identifier S240. Additionally or alternatively, embodiments of the method 200 can include distributing a set of identifiers across a set of nodes S250; generating a content channel S260; determining content relevance S270; and/or any other suitable processes.

Figure 10:
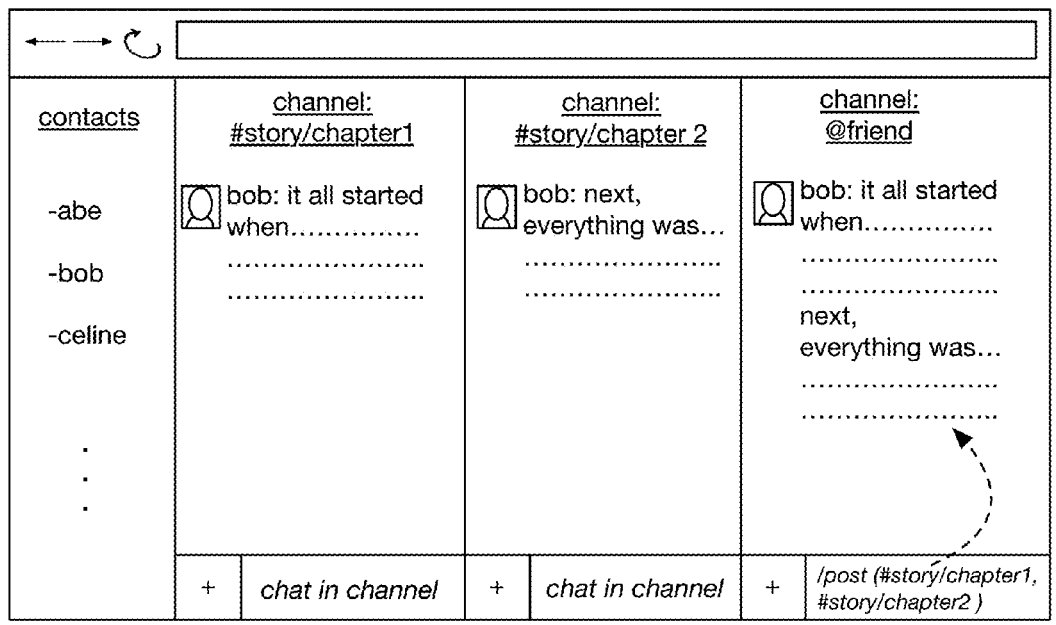
FIG. 10 is an example of content generation.

Receiving content (e.g., media; content updates; etc.) for a content channel S210 functions to receive content for dissemination to secondary user accounts (e.g., user accounts subscribed to the content channel). The content is preferably received in association with a parent data object, but can alternatively be received in isolation. The content can be generated based on the parent data object (e.g., an action performed on the parent data object); however, the parent data object can be otherwise associated with the content. In one example, the content is a post within a content channel, where the content is associated with the content channel. In a second example, the content is a reply to a specific piece of prior content (e.g., the user selected prior content to respond to), where the content is associated with the specific piece of prior content. In a third example, as shown in FIG. 10, the content is a modified version of a piece of content, where the content is associated with the source content. In a specific example, the method 200 can include receiving a user input (e.g., textual input at an entry field, a pre-defined command) including a first and a second channel identifier; retrieving first and second content (e.g., content updates) based on the first and the second channel identifiers (e.g., the first content update posted to the first channel; the second content update posted to the second channel; etc.); and generating third content (e.g., a third content update) based on the user input and the first and the second content updates, where the third content can be subsequently processed (e.g., assigned a content identifier; transmitted to secondary user accounts; etc.). In an illustrative example, receiving "/pdf(#user/book/chp1, #user/book/chp2) can generate a .pdf from the content in "chapter 1" and "chapter 2" subchannels of the #user/book channel, where .pdf is the user input and the subchannel references are the content identifiers. Additionally or alternatively, any other suitable data object can be associated with the content in any other suitable manner. However, receiving content can be performed in any suitable manner.

Assigning a content identifier (e.g., update identifier) to the content (e.g., content update) S220 functions to identify content. The identifier is preferably an alphanumeric value (e.g., a 128-bit value), but can alternatively be an image, stream of values (e.g., a pattern over time), and/or have any other suitable structure. Examples of identifiers include hash values (e.g., digest), timestamps, random numbers, namespaces, URIs, or any other suitable identifier. For example, the method 200 can include modifying (e.g., at the SN system) a content update for a content channel with a channel hyperlink linking to the channel based on the channel identifier; and transmitting the content update (e.g., including the hyperlink) to user accounts associated with the channel.

The identifier is preferably a global identifier but can alternatively be a local identifier. The identifier can be generated and assigned independent of the content (e.g., randomly generated and assigned), generated and assigned based on the content or a property thereof, or otherwise determined and/or assigned. The identifier for a piece of content can be generated based on: the content itself (e.g., based on the bits forming the content), the content timestamp, the authoring user account identifier, the authoring SN client identifier, the geographic location associated with the content (e.g., the user device location at content receipt or generation, etc.), the identifier for the parent data object, the content version, a second global identifier for the content, and/or based on any other suitable parameter value. In a first example, a hash value can be generated from the global identifier for the content (e.g., automatically assigned based on the content itself) and the content version. In a second example, the method 200 can include receiving a content update for a first channel at a first channel node (e.g., where the content update is generated based on a preceding content update); assigning a global content identifier (e.g., identifying the preceding content update) to the content update as a parent identifier; assigning a second global content identifier to the content update; and transmitting the content update with the parent identifier and the second global content identifier to a user account associated with the content channel. The global and/or local identifier can be generated based on and/or encode the generation timestamp, the content itself, the user identifier, the associated geographic location, and/or any other suitable information. However, any suitable number of identifiers (e.g., global identifiers; local identifiers; dependent or independent identifiers; identifiers of other types of data objects; etc.) can be assigned to the content, and assigning identifiers to content and/or other data objects can be performed in any suitable manner.

Figure 4:
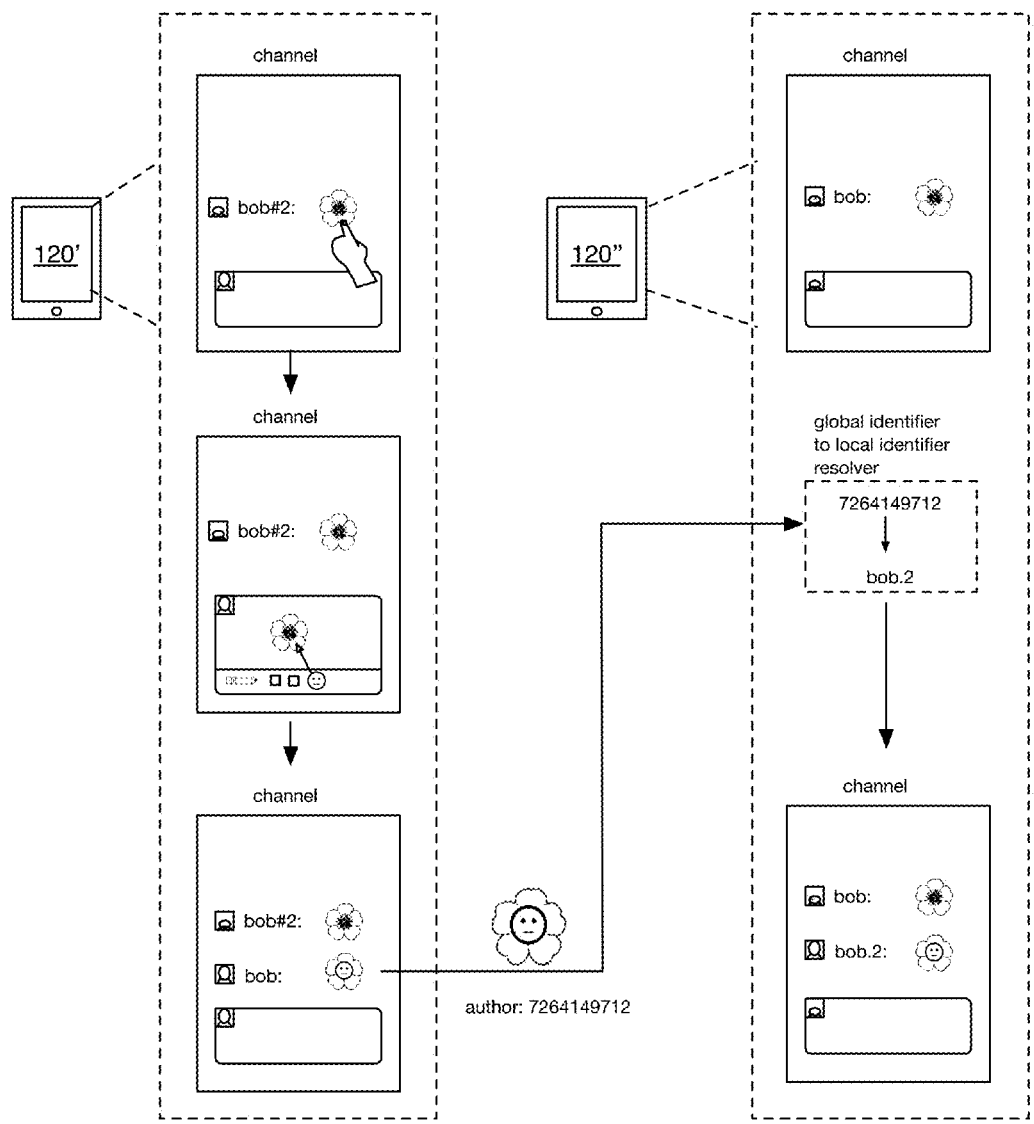
FIG. 4 is an example of content modification.

As shown in FIG. 1C, transmitting the content with the content identifier to a user account (e.g., through posting to a content channel) S230 functions to disseminate the content to a user account. The content is preferably transmitted from the SN system to a set of SN clients subscribed to the channel to which the content is directed, but any suitable components can receive and/or transmit the content. In variations, as shown in FIG. 4, the method 200 can additionally include sending a packet associated with the content to an endpoint. The packet can be sent concurrently with content posting or receipt, sent asynchronously (e.g., after content receipt), packaged with other packages and sent at a predetermined frequency, or be sent at any other suitable time. The packet can include the content, an identifier for the content (e.g., a URI generated from the global identifier), the updated version of the content channel, an identifier for the updated channel, content features, and/or any other suitable information derived from the content to secondary clients or user accounts (e.g., secondary clients that are online), a remote computing system, or any other suitable endpoint. When sending the information to secondary clients or user accounts, the content-derived information can be broadcast by the primary client, pushed to secondary clients and/or user accounts, sent to secondary clients and/or user accounts in response to receipt of a request for new content from the secondary clients and/or user accounts, or otherwise sent to the secondary clients and/or user accounts. In one variation, the secondary client can receive the content only when both the primary client (e.g., the SN client 120 posting the content) and secondary clients are concurrently online when the content is posted. In a second variation, the secondary client can receive the content asynchronously, where a remote computing system caches the content until the secondary client connects to the remote computing system). In a third variation, the secondary client can receive the content asynchronously, where the secondary client receives the content through an intermediary client supporting an intermediary user account that both the first and second user accounts are associated with. Additionally or alternatively the secondary client can otherwise receive the content, and transmitting content can be performed in any suitable manner.

Figures 5, 6:
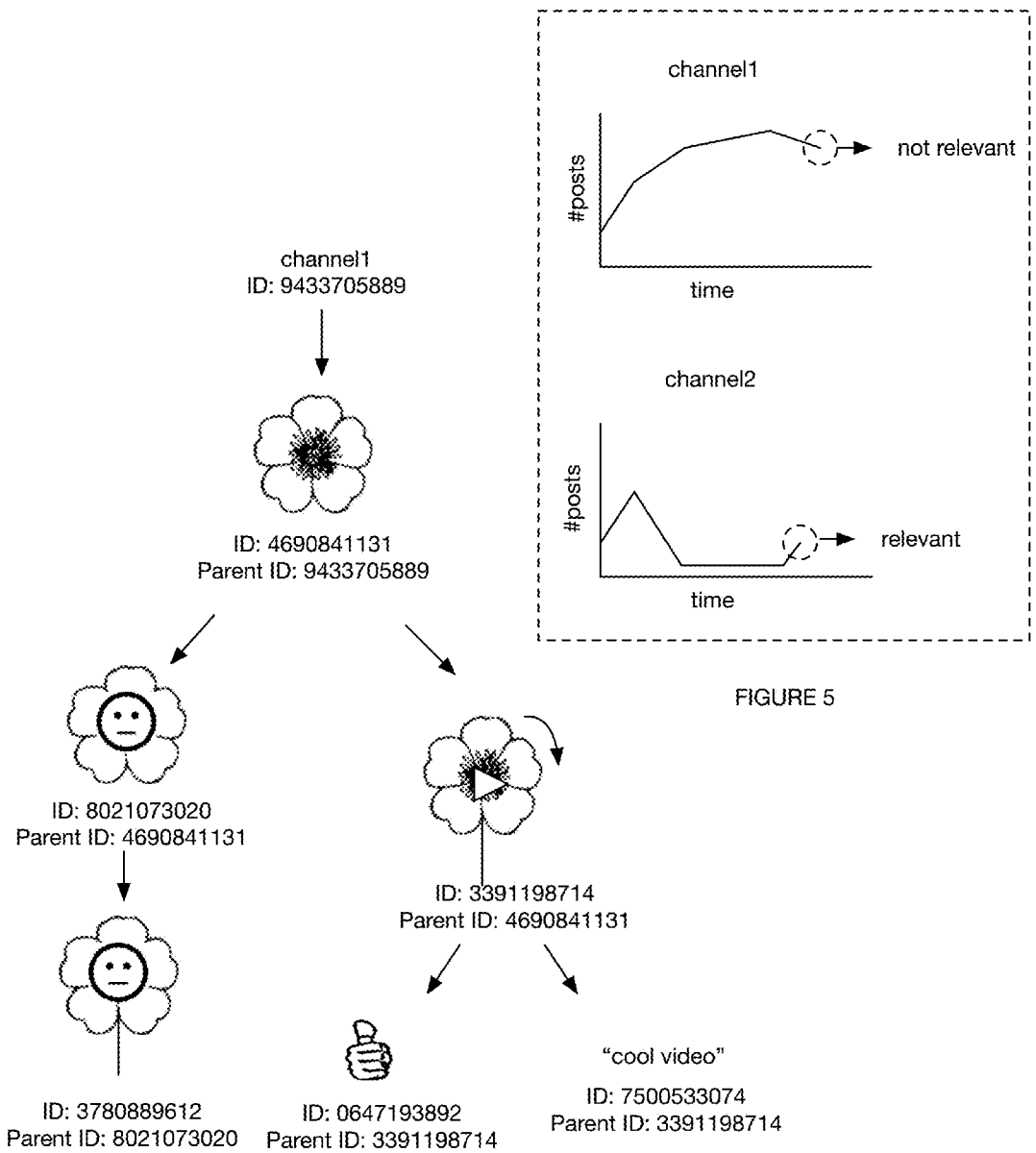
FIG. 5 is an example of relevance determination, comparing two channels associated with a user account.
FIG. 6 is an example of content version tracking.

Modifying (e.g., updating) a content channel with the content S240 functions to present the content within the content channel to the user account. Modifying the content channel can notify the user of potentially relevant content in a lightweight manner that minimizes or reduces the number of actions required to view the content in the source channel. Modifying the content channel can include modifying a content channel different from the source channel (e.g., separate and discrete, having different global identifiers, different local identifiers, etc.), but can alternatively be the same content channel, the same channel version (e.g., as shown in FIG. 4), different versions of the same channel, and/or be any other suitable content channel. Modifying the content channel is preferably based on a content identifier and/or other data object identifier associated with the content. In a first example, the content inserted into the content channel can link and/or otherwise reference source data based on a global identifier for the content (e.g., be a URL with the global identifier) and associated parent identifiers (e.g., as shown in FIG. 6), but can alternatively be inserted in any other suitable manner based on any other suitable parameter. In a second example, content can be presented with a user account identifier (e.g., global, local, etc.) identifying the user account posting the content. However, modifying content channels can be based on any suitable data.

The content is preferably posted to the local version of the content channel stored by the client (e.g., wherein different users and/or clients can store and/or present different versions of the same channel, with different organization, skins, content, etc.), but can alternatively be posted to the global version of the content channel stored across multiple clients, stored by the remote computing system, and/or stored by any other suitable system. The content is preferably inserted in response to the content relevance meeting a predetermined condition (e.g., surpassing a predetermined threshold), but can be posted in response to any other suitable condition being met. The predetermined condition can vary as a function of time (e.g., time of day), geographic location, virtual location (e.g., location in a virtual space), second user account schedule, second user account activity (e.g., frequency), channel activity, or any other suitable parameter. The predetermined condition can be determined for a specific user account, identity, content channel, or other data structure; a set of user accounts, identities, content channels, or other data structures; or for any other suitable number of user account, identities, content channels, or other data structures related in any suitable manner. For example, the predetermined condition can be a post rate of less than a threshold number per minute, where the threshold can be selected to indicate heavy engagement, such as heated debate (e.g., above the threshold) or casual browsing (e.g., below the threshold), where the content is inserted in response to the rate falling below the threshold. However, the predetermined condition can be any otherwise selected. Additionally or alternatively, content can be inserted in response to any other suitable condition being met. In a variation, posting content to a content channel can be in response to selection by a second user of a content discovery option. The content discovery option can initiate one or more of: random content discovery (e.g., posting content from a random channel to the content channel, directing the second user to a random channel, etc.), directed content discovery (e.g., based on user preferences, user behavior patterns such as channel visiting frequency, channel metrics such as popularity, etc.), parameter-based discovery (e.g., inserting content from a second channel associated with a nearby geographic location into a first channel; inserting content from a second channel associated with a nearby user into a first channel, etc.), and/or any other suitable discovery based on any other suitable variable. Additionally or alternatively, content discovery can be initiated without selection of a random content option. However, content discovery can be otherwise performed.

Automatically-inserted content from other content channels are preferably distinguished over user-generated content posted within the content channel, but can alternatively be indistinguishable. Automatically-inserted content can be distinguished: visually (e.g., using a different typeface, weight, color, etc.; using an outline or border; using an icon; using different size frames; etc.), audibly (e.g., decreased volume compared to user-generated content), or otherwise distinguished. The automatically-inserted content can decay at a different rate than user-posted content (e.g., disappear faster than user-posted content from the content channel), at the same rate, or be associated with any other suitable set of parameters and characteristics. The inserted content can be inserted into and/or located within the channel and/or content stream based on: generation time (e.g., in time-series order relative to the remaining content within the channel), relevance score, or based on any other suitable parameter.

Modifying the content channel with the content can optionally include generating a snippet from the content, and posting the snippet (e.g., in lieu of the full content). The snippet can be: a thumbnail, a quote from the content, a summary of the content, a clip of the content (e.g., a subset of the audio-video frames), or any other suitable secondary content representative of the original content. The snippet can be automatically generated, selected by the authoring user, or otherwise determined. The snippet can be generated by the primary client, secondary client, SN system, or any other suitable system. The snippet can be generated based on secondary user account preferences (e.g., manually entered, automatically learned, etc.), the content channel's rules, or based on any other suitable input. In one variation, because the snippets are generated by content relevance modules tailored to the respective user account, the snippet generated for the same piece of content sent to multiple user accounts can be different.

The method 200 can additionally or alternatively include distributing a set of identifiers across a set of nodes S250, which functions to enable inventive distributions of functionality across the SN (e.g., in variations including a distributed SN). Distributing identifiers can be based on: static sharding, consistent hashing, dynamic sharding, range mapping, and/or any other suitable data allocation approaches. In a first variation, distributing identifiers can include distributing channel management (e.g., through distributing channel identifiers) across a set of nodes (e.g., each node is responsible for a subset of channels, such as 1/N channels for N nodes). In other variations, distributing identifiers can include distributing user account management, content management, and/or other data object management across the set of nodes. However, distributing identifiers across the nodes can be performed in any suitable manner.

The method 200 can additionally or alternatively include generating a content channel S260, which functions to create channels for content sharing. Generating content channels preferably includes generating any suitable data objects associated with the channel (e.g., global identifiers, default permissions, metadata, etc.), storing the data objects (e.g., local versions at user devices; global versions at the channel database; etc.), and/or otherwise processing data objects for content channel creation. Generating content channels can be based on: channel creation requests (e.g., including a channel identifier selected by the user account; etc.), content (e.g., generating a channel based on an image, where the channel identifier is associated with the content identifier identifying the image), other channels (e.g., parent channels), and/or any other suitable data objects. For example, the method 200 can include generating a second channel based on a first content update for a first channel; assigning a second channel identifier to the second channel; associating the second channel identifier with a first channel identifier (e.g., identifying the first channel) and a content identifier (e.g., identifying the content update); and distributing the second channel identifier to a channel node of the set of remote channel nodes. Generating content channels is preferably in response to receiving channel creation requests from user accounts. For example, the method 200 can include: generating (e.g., with an SN client) a local channel at a user device in response to receiving a channel creation request for a channel from a user account associated with the user device; transmitting the channel creation request to the SN system (e.g., a node of the SN system with available functionality to manage the channel); and generating and storing a global channel corresponding to the channel at the channel database. However, generating content channels can be performed in any suitable manner.

The method 200 can additionally or alternatively include determining content relevance S270, which functions to determine whether the content should be provided to a user account. The content relevance can be determined based on the association strength between a primary user account (e.g., posting the content) and secondary user account (e.g., potentially receiving the content), physical proximity between the primary and secondary user devices executing the primary and secondary clients, the content's relevance to the user account, the association strength between the user account and the channel, a rarity score of the content for the channel, the content association with the a channel historically visited (e.g., most recently visited, most frequently visited, etc.) by a user account, metadata (e.g., temporal indicators; structural metadata indicating associations between parent and child data objects; avatars; identifiers; location metadata; etc.) the user account's current identity, and/or any other suitable factor. For example, the method 200 can include determining a content relevance based on a child identifier (e.g., a content identifier), a parent identifier (e.g., a source content identifier), and associated location metadata (e.g., for the content identified by the content identifier and source content identified by the source content identifier, etc.).

The association strength between the primary and secondary user account can be determined based on the type of user account association, the frequency of digital interaction (e.g., across one or more channels), the frequency of physical interaction (e.g., based on the respective user devices' location histories), the number of shared user account contacts (e.g., based on the secondary user account's social graph), degrees of removal, or based on any other suitable parameter (e.g., extracted from network analysis of real-time chat and/or physical signal-strength signals). In one example, an explicit connection between user accounts (e.g., friends, mutual presence in favorites' lists, etc.) can be deemed a stronger association than user accounts associated as concurrent nonparticipating viewers of the same channel; content from a user account linked to the secondary user account through the former association can be deemed more relevant (e.g., weighted higher) than content from a user account linked to the secondary user account through the latter association.

The physical proximity between the first and second user device can be determined based on the respective user device locations (e.g., GPS locations, cell tower locations, etc.), whether the user devices are wirelessly connected (e.g., through a short-range connection, such as BLE), the physical density of a user device population (e.g., how tight or sparse a group is physically), or be based on any other suitable parameter. The content relevance to the secondary user account can be determined based on the user account preferences (e.g., manually entered or automatically generated based on user account activity) and the content's subject matter, content type (e.g., image, etc.), content timestamp, or any other suitable parameter. However, the content relevance can be otherwise determined. The content's subject matter can be determined through natural language processing, image analysis (e.g., facial recognition, gesture recognition, expression recognition, etc.), or any other suitable approach. For example, when a user account has a high preference score for dogs, content mentioning dogs or including images of dogs can be weighted higher than content without dogs.

The association strength between the secondary user account and the content channel can be determined based on the secondary user account's relationship with the content channel (e.g., member of the channel, commenter of the channel, channel viewer, never viewed the channel, etc.), secondary user account's participation history with the content channel (e.g., regular commenter, infrequent commenter, never commented, etc.), channel topic (e.g., most frequently discussed topic or keywords, channel name, channel purpose as determined by a moderator, etc.), channel association with tertiary user accounts associated with the secondary user account, or based on any other suitable parameter. For example, content posted to a content channel that the secondary user account is currently viewing can be deemed highly relevant to the secondary user account, while content posted to a content channel that the secondary user account has never viewed can be deemed irrelevant to the secondary user account. The rarity score of the content for the content channel can be determined based on: the overall frequency of content generation for the content channel (example shown in FIG. 5), the generation frequency of content having the content's subject matter, the authoring user account's posting frequency within the content channel, or based on any other suitable parameter. For example, content posted in a content channel having a high content posting frequency can be weighted lower than content posted in a content channel having a low content posting frequency.

Each factor's value and/or factor's relevance to the secondary user account can additionally decay as a function of time, location, or any other suitable parameter, and/or be reinforced with new interactions between the secondary user account and data object. For example, the association strength between a primary and secondary user account can weaken as over time, but be reinforced with frequent interactions. In a second example, the association strength between the secondary user account and the content channel can weaken with increased distance between the second user device and a physical location associated with the content channel. However, the content relevance can decay in any other suitable manner. The content's relevance to the second user is preferably determined based on a current value of the factors (e.g., at the time of analysis), but can alternatively be determined based on the factor values at any other suitable time. The content relevance can be determined using machine learning techniques, calculated using an equation (e.g., where each factor is weighted), selected from a predetermined chart or graph based on one or more factors, or otherwise determined.

In one variation, the content relevance can be determined by a set of trained modules based on the factor values. The modules can employ a probabilistic method, heuristic method, deterministic method, neural network method, and/or any other suitable approach to determine content relevance. In this variation, the method 200 can optionally include: in response to determining that the content is relevant to the user and presenting the content to the user, determining a user action on the content and updating the modules based on the user action. For example, if a user takes an action indicative of interest on the content (e.g., selects the content to visit the content channel, generates derivatory content based on the content, replies to the content, shares the content, such as to another content channel, etc.), the module can be reinforced based on the content's factors and user action. In a second example, if a user takes an action indicative of non-interest on the content (e.g., not acting on the content, scrolling past the content beyond a threshold speed, actively deleting or muting the content, etc.), the module can be re-trained based on the content's factors and user action. Additionally or alternatively, indicators of user interest in the recommended content can be otherwise used. However, the content relevance can be otherwise determined.

In one variation in which the SN clients store local versions of the data objects (e.g., in a DVCS system), the SN client can receive the packet (e.g., content, content identifier, etc.), determine the content's relevance to the user, and discard the packet in response to the content's relevance falling below a threshold relevance value. Alternatively, the secondary client can receive the packet, store the packet for a predetermined period of time in response to the content's relevance falling below a threshold relevance value, periodically assess the content's relevance to the secondary user account (e.g., when the secondary user account takes predetermined actions, such as joining or viewing new channels, etc.), and discard the packet after the predetermined period of time. However, determining content relevance can be performed in any suitable manner.

5. Examples

In a first example, when relevant content is inserted into a first content channel (e.g., a second user's home channel) associated with the user account based on past user account digital interaction and/or past user device physical locations or connections, a copy of the content is inserted as a snippet to the content channel currently viewed by the user. Alternatively, the copy of the content can be added to a predetermined endpoint, such as the user account's home channel. The content copy is preferably identified by the same global identifier as the original content within the first channel, but can alternatively be identified by a different global identifier. When the content copy is selected by the user account, the first channel can be automatically opened. This can additionally include automatically associating the user account with the source channel, authoring user account, user accounts associated with the source channel (e.g., viewing, members, etc.), content lineage, content subject matter, or any other suitable parameter or data object. Alternatively, selection of the content version can open an annotation tool, where the annotated content can be posted to the user account's current channel, the source channel, or any other suitable channel. The annotated content is preferably associated with a global identifier different from the source content global identifier, but can alternatively be associated with the same identifier.

In a second example, historic content in a content channel can be automatically summarized, deleted, or otherwise decayed over time (e.g., after a predetermined period of time has passed). Content summarization can include selecting a subset of the historic content for retention, where the retained content can include the most viewed content, most responded-to content, most referenced or shared content, or any other suitable content. Additionally or alternatively, content summarization can include processing the subject matter of the content (e.g., one or more pieces), and generating or selecting a representative quote, frame, or other sub-component of the content. However, the content can be otherwise summarized.

In a third example, new data objects can be automatically created in response to detection of a wildcard. In a fourth example, a user can add various types of content (e.g., text, images, video, audio, etc.) through the same interface. In a specific example, a short input (e.g., short selection) of the interfaces' input region can bring up a keyboard, while a long input can automatically launch the videocamera. In a fifth example, new avatars (e.g., content representative of the user account) can be applied only to content subsequently posted by the user account. In a sixth example, different actions can be taken on the content in response to receipt of different inputs. In a first specific example, a short selection of the content can open the source channel, a long selection (e.g., click and hold) of the content can open an annotation tool, and selecting and sliding the content horizontally can post a copy of the content (e.g., identified by the same or different global identifier as the acted-upon content) in a new channel. These actions can be tracked (e.g., locally, globally) to determine the virality of the content and/or content relevance to user accounts.

In a seventh example, auxiliary applications can be connected to the social networking system (e.g., via an SDK). When the auxiliary application is deemed relevant to a user account, a reference to the auxiliary application can be automatically inserted into a channel associated with the user account (e.g., currently viewed channel, home channel, etc.). The reference can be associated with (e.g., link to) an action for the auxiliary application, such as opening the auxiliary application on the user device, downloading the auxiliary application, or any other suitable action. The reference can be automatically generated, predetermined, or otherwise determined. In a specific example, the auxiliary application can be deemed relevant to a user account (running on a user device) when other user accounts running on devices physically proximal the user device have the auxiliary application open. However, the social networking system can otherwise interface with auxiliary applications.

Figure 7:
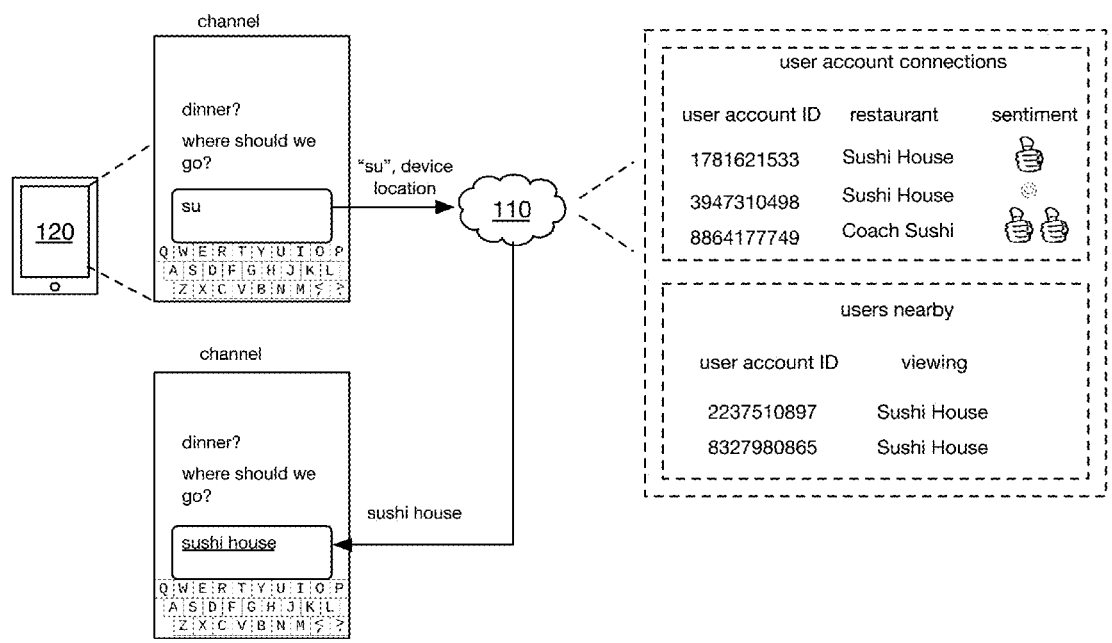
FIG. 7 is an example of recommendation determination using the data objects associated with the user account.

In an eighth example, the social networking system can automatically complete user inputs based on associated data objects. A client can receive partial user input and determine (e.g., retrieve, filter, etc.) a list of data objects (e.g., text, images, videos, channels, etc.) that are related to the partial input from the data objects associated with the user account. By searching the extended-local social graph of the user account, this example can function to tailor recommendations, auto-completed content, or other features to the user account. In a specific example (e.g., shown in FIG. 7), the client can receive "su" as a partial user input, request all content associated with words or topics starting with "su" from the associated data objects, sort the returned content in decreasing relevancy order, and present the data objects as suggested auto-complete content. In a second specific example, the client can receive "sushi restaurant" from a user account, request all sushi restaurants reviewed or physically visited by other user accounts associated with the user account, and present the list of sushi restaurants in decreasing relevancy order to the user. In a third specific example, the client can automatically determine that an event is being planned within a content channel (e.g., based on NLP), automatically determine the event details, and automatically add the event details to the calendars associated with the user accounts associated with the content channel (e.g., actively posting within the content channel, viewing the content channel, etc.). However, the user account's social graph can be otherwise leveraged.

In a ninth example, the client can be integrated with secondary applications of the social networking system (e.g., browser applications), where the secondary applications can function as another data object that responds to predefined events (e.g., client posting events, etc.). The secondary application can be specific to and/or applied to a user account, client, content channel, or other data structure. The secondary application can additionally or alternatively be run on the client (e.g., automatically updated/installed). Secondary application management can be centralized (e.g., at a remote computing system), distributed (e.g., different versions hosted by different user devices, where a version stored by a first user device is updated when the first user device connects to a second user device storing a later version), or otherwise managed. The secondary application can supplement, modify, or otherwise influence client operation. The secondary application can additionally function as a connection between the client and a different computing system (e.g., where the clients are part of a DVCS system and the secondary application functions as a connection to a remote computing system, gaming system, etc.), or perform any other suitable functionality. The secondary application can be developed on the client, on a separate data structure (e.g., browser), or otherwise developed.

In a first specific example, the secondary application can perform the auto-complete functionalities, where the client posts a request to the secondary application, and the secondary application returns a list of content for chat auto complete. In a second specific example, the secondary application requests a client to take a snapshot of the local client environment (e.g., visual snapshot, snapshot of current settings, snapshot of current content, snapshot of current data structure), where the secondary application can display one or more client snapshots from one or more user account at a predetermined endpoint (e.g., content channel, browser, etc.). The secondary application can have different functionalities, capabilities, or responses when: run on different devices, applied to different data objects, or executed in association with different runtime environments. For example, the secondary application can show different sets of information, such as administrative information, unit testing, and debugging info, when run on a browser instead of a client. In a second specific example, the secondary application can be associated with a game match within a digital game (e.g., a MMORPG system), where the secondary application can automatically change color of a channel's navigation bar to indicate a match parameter value (e.g., player's status, who's winning, etc.) to user accounts viewing the content channel. However, the secondary application can operate in any other suitable manner.

Figure 9:
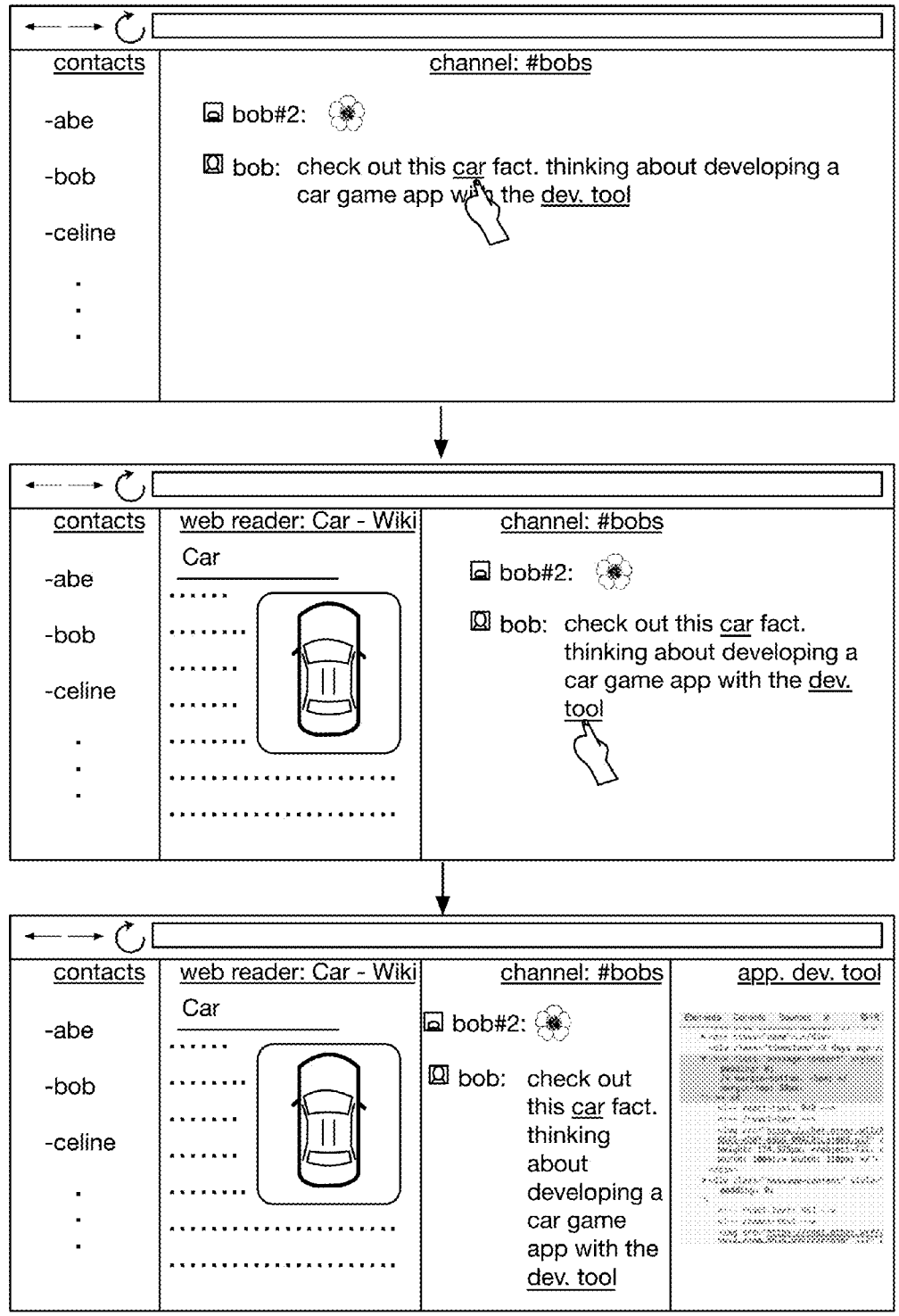
FIG. 9 is an example of an application development tool.

As shown in FIG. 9, in a second specific example, the secondary application can include an application development tool for developing auxiliary and/or secondary applications for the client. The application development tool is preferably displayed at the client (e.g., as a column side-by-side with a channel column, as a tab, etc.), in order to enable previewing of features developed with the application development tool, but can optionally be an independent tool. However, the application development tool can otherwise operate. In a third specific example, a secondary application can aggregate content of a specific type posted by a user (e.g., aggregate all media captured with the camera of the user device associated with the user, aggregate all movies posted to any channel by the user, etc.). Aggregated content can be published at a channel, subchannel, contextual pocket, and/or other suitable component.

As shown in FIG. 9, in a tenth example, the client can be integrated with a web reader application. The web reader application can browse, display, interact with, and/or perform any other suitable action in relation to the web. Rendering websites and/or web applications with the web reader can include modifying the presentation style (e.g., visual such as font and color, audio, etc.) of the website and/or web application (e.g., to improve display at the user device), automatically determining and extracting content snippets for posting in the content channel, and/or otherwise rendering all or part of the website and/or web application.

In an eleventh example, the client can integrate with a third party service (e.g., through a secondary application). Integrating with third party services can be in response to user authorization, based on user preferences, based on default settings, and/or performed at any suitable time. In a specific example, a client can integrate with a third party cloud storage service. Files stored in the third party cloud storage service can be accessible (e.g., downloaded, viewed), shared (e.g., through invitations to other contacts, posted to content channels, contextual pockets, etc.), associated with permission levels, and/or otherwise manipulated by the client. However, integration with a third party service can be otherwise performed.

An alternative embodiment preferably implements the above methods in a computer-readable medium storing computer-readable instructions. The instructions are preferably executed by computer-executable components preferably integrated with a system. The system can include a plurality of clients, each hosting one or more user accounts, where the plurality of user accounts can be transiently linked through virtual connections (e.g., socially, through actions, through common associations, etc.), physical connections, or other connections. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device. Although omitted for conciseness, the preferred embodiments include every combination and permutation of the various system components and the various method processes, where the method processes can be performed in any suitable order, sequentially or concurrently. As a person skilled in the art will recognize from the previous detailed description and from the figures and claims, modifications and changes can be made to the preferred embodiments of the invention without departing from the scope of this invention defined in the following claims.

We claim:

1. A distributed social network (SN) comprising:
a set of remote channel nodes storing a set of distributed channel identifiers, the set of remote channel nodes comprising a channel node configured to:
store a channel identifier from the set of distributed channel identifiers;
store a set of user account identifiers associated with the channel identifier;
receive a media update for media associated with a media channel identified by the channel identifier; and
transmit the media update to a first user account identified by the set of user account identifiers; and
a first SN client operating on a first user device associated with the first user account, the first SN client configured to:
store a first local channel at the first user device, the first local channel corresponding to the media channel and comprising the media;
receive the media update from the channel node;
update the first local channel with the media update; and
receive a set of subscription requests from the first user account for a set of channels corresponding to a first set of channel identifiers stored at the channel node and a second set of channel identifiers stored at a supplemental channel node of the set of remote channel nodes;
group a subset of the set of subscription requests into an aggregate request based on the first set of channel identifiers, the aggregate request comprising the subscription request; and
transmit the aggregate request to the channel node.

2. The distributed SN of claim 1, further comprising a second SN client operating on a second user device associated with a second user account identified by the set of user account identifiers, the second SN client configured to:
store a second local channel at the second user device, the second local channel corresponding to the media channel and comprising the media;
receive user-generated media for the media channel from the second user account, wherein the media update comprises the user-generated media;
update the second local channel with the user-generated media; and
transmit the media update to the channel node in response to updating the second local channel.

3. The distributed SN of claim 2, wherein the second SN client is further configured to:
store, at the second user device, an association between the second local channel, the channel identifier, and the channel node; and
select the channel node from the set of channel nodes to receive the media update, based on the association.

4. The distributed SN of claim 1, further comprising a remote channel database storing a global channel corresponding to the media channel and comprising the media, wherein the channel node is further configured to:
update the global channel at the remote channel database with the media update in response to receiving the media update; and
transmit the media update to the first user account in response to updating the global channel.

5. The distributed SN of claim 1, wherein the channel node is further configured to:
associate the media update with an update identifier associated with a set of historic update identifiers identifying a set of historic media updates;
receive a subscription request to the media channel from a second SN client; and
transmit the update identifier to the second SN client in response to receiving the subscription request,
wherein the second SN client is configured to receive a set of media comprising the media based on the update identifier, the set of media generated from the media update and the set of historic media updates.

6. The distributed SN of claim 5, wherein the update identifier is in a sequence with and sequentially follows the set of historic update identifiers, and wherein the second SN client is configured to receive the set of media based on the update identifier and the sequence.

7. The distributed SN of claim 1,
wherein the first SN client comprises a media relevance module customized for the first user account and configured to execute on the first user device to determine a relevance of the media update to the first user account in response to receiving the media update, and
wherein the first SN client is configured to update the first local channel with the media update in response to the relevance satisfying a threshold condition.

8. The distributed SN of claim 7, wherein the media relevance module is configured to:
obtain a set of computer-implemented rules stored at the first user device and defining the relevance as a function of user device location;
locally obtain the user device location from the first user device; and
execute on the first user device to determine the relevance by evaluating the user device location against the set of computer-implemented rules.

9. The distributed SN of claim 1, wherein the media comprises a metadata key-value pair associated with the media channel, wherein the media update comprises an updated key-value pair, and wherein the first SN client is configured to update the metadata key-value pair of the first local channel with the updated key-value pair of the media update.

10. A method for distributing functionality across a social network, the method comprising:
distributing, across a set of remote channel nodes, a set of channel identifiers comprising a first channel identifier associated with a user account identifier;
receiving, at a first channel node of the set of remote channel nodes, a first content update for a first channel identified by the first channel identifier;
assigning a first global content identifier to the first content update;
transmitting the first content update with the global content identifier from the first channel node to a user device associated with a user account identified by the user account identifier;
updating a first local channel at the user device with the first content update based on the global content identifier, the first local channel corresponding to the first channel; and
receive a set of subscription requests from a first user account for a set of channels corresponding to a first set of channel identifiers stored at the channel node and a second set of channel identifiers stored at a supplemental channel node of the set of remote channel nodes;

group a subset of the set of subscription requests into an aggregate request based on the first set of channel identifiers, the aggregate request comprising the subscription request; and transmit the aggregate request to the channel node.

11. The method of claim 10, further comprising:

generating a second channel based on the first content update;

assigning a second channel identifier to the second channel;

associating the second channel identifier with the first channel identifier and the global content identifier; and distributing the second channel identifier to a second channel node of the set of remote channel nodes.

12. The method of claim 11, further comprising:

assigning a second global content identifier to a second content update for the second channel, the second global content identifier associated with the first and the second channel identifiers;

transmitting the second content update with the second global content identifier to the user device; and updating a second local channel at the user device with the second content update based on the second global content identifier, the second local channel corresponding to the second channel.

13. The method of claim 12, further comprising:

receiving a user input comprising the first and the second channel identifiers;

retrieving the first and the second content updates based on the first and the second channel identifiers;

generating a third content update based on the user input and the first and the second content updates; and transmitting the third content update to the user device.

14. The method of claim 12, further comprising:

modifying the second content update with a channel hyperlink corresponding to the first channel based on the first channel identifier, wherein transmitting the second content update to the user device comprises transmitting the second content update comprising the channel hyperlink.

15. The method of claim 10, further comprising:

receiving a second content update for the first channel at the first channel node, the second content update generated based on the first content update;

assigning the first global content identifier to the second content update as a parent identifier;

assigning a second global content identifier to the second content update; and transmitting the second content update with the parent identifier and the second global content identifier to the user device.

16. The method of claim 15, further comprising determining a relevance of the second content update to the user account based on the second content update and the parent identifier, wherein transmitting the second content update is in response to the relevance satisfying a threshold condition.

17. The method of claim 16, wherein the parent identifier is associated with first location metadata for the first content update, wherein the second global content identifier is associated with second location metadata for the second content update, and wherein determining the relevance of the second content update comprises determining the relevance based on the first and the second location metadata.

18. The method of claim 10, wherein receiving the first content update comprises receiving the first content update from a posting user account identified by a global user account identifier associated with the first channel identifier;

wherein transmitting the first content update comprises transmitting the first content update with the global user account identifier to the user device;

the method further comprising:

mapping the global user account identifier to a local user account identifier stored at the user device; and presenting the local user account identifier with the first content update at the user device.

19. The method of claim 18, wherein the first content update comprises a metadata update, and wherein updating the first local channel at the first user device comprises updating the local user account identifier stored at the user device with the metadata update.

* * * * *